US008820041B2

(12) United States Patent
Arnold et al.

(10) Patent No.: US 8,820,041 B2
(45) Date of Patent: Sep. 2, 2014

(54) HAYMAKING DEVICE MOVABLE BETWEEN TRANSPORT AND OPERATIVE POSITIONS AND METHOD THEREFOR

(71) Applicant: Forage Innovations B.V., Maassluis (NL)

(72) Inventors: Martin Arnold, Steinlah (DE); Cornelis Christianus Franciscus Havermans, Zevenbergen (NL); Marc Rinkel, Meine (DE)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 14/070,635

(22) Filed: Nov. 4, 2013

(65) Prior Publication Data

US 2014/0053526 A1 Feb. 27, 2014

Related U.S. Application Data

(63) Continuation of application No. 13/606,038, filed on Sep. 7, 2012, now Pat. No. 8,602,121, which is a continuation of application No. PCT/NL2011/000017, filed on Mar. 4, 2011.

(30) Foreign Application Priority Data

Mar. 8, 2010 (NL) .................................... 1037783

(51) Int. Cl.
- *A01D 76/00* (2006.01)
- *A01D 78/00* (2006.01)
- *A01D 80/00* (2006.01)
- *A01D 84/00* (2006.01)
- *A01B 73/06* (2006.01)
- *A01D 78/10* (2006.01)

(52) U.S. Cl.
CPC .............. *A01D 80/00* (2013.01); *A01B 73/067* (2013.01); *A01D 78/1014* (2013.01)
USPC ............................................ 56/367; 172/311

(58) Field of Classification Search
USPC ......... 172/311, 272, 452, 662, 623, 622, 588, 172/605; 280/656; 111/57; 56/377, 367
See application file for complete search history.

(56) References Cited

U.S. PATENT DOCUMENTS 2,380,298 A * 7/1945 Dyrr .............................. 172/588
2,559,002 A * 7/1951 Brock ........................... 172/605
(Continued)

FOREIGN PATENT DOCUMENTS

AU 1678076 A 3/1978
CA 2313362 A1 1/2002
(Continued)

OTHER PUBLICATIONS

The International Search Report for PCT/NL2011/000017 issued on Jun. 7, 2011.
(Continued)

*Primary Examiner* — Arpád Fábián-Kovács
(74) *Attorney, Agent, or Firm* — Hoyng Monegier LLP; Minerva Rivero; David P. Owen (57) ABSTRACT

The haymaking device has a frame having a main beam which extends in a longitudinal direction and defines a longitudinal center line, and two side arms extending on both sides of the main beam, wherein the side arms each carry at least one crop processing tool and are at an inner end hingeably connected to a slide connection which is slidable there along the main beam, wherein the side arms are movable between a transport position, in which they substantially extend along the main beam, at a first angle to the main beam, and an operative position, in which the side arms extend at a second angle, larger than the first angle, from the main beam, wherein the side arms are movable between the transport position and the operative position by a sliding movement of the slide connection along the main beam.

6 Claims, 13 Drawing Sheets

(56) References Cited

U.S. PATENT DOCUMENTS

| | | | |
|---|---|---|---|
| 3,522,860 A | 8/1970 | Pürrer et al. | |
| 3,791,673 A | 2/1974 | Hornung | |
| 3,982,773 A * | 9/1976 | Stufflebeam et al. | 280/656 |
| 4,058,172 A | 11/1977 | Blair et al. | |
| 4,066,274 A | 1/1978 | Adee | |
| 4,126,187 A * | 11/1978 | Schreiner et al. | 172/311 |
| 4,319,643 A | 3/1982 | Carter et al. | |
| 4,364,581 A | 12/1982 | Shoup | |
| 4,496,004 A | 1/1985 | Frase et al. | |
| 4,504,076 A | 3/1985 | Bedney | |
| 4,518,046 A * | 5/1985 | Rettig et al. | 172/311 |
| 4,596,290 A * | 6/1986 | Bedney | 172/311 |
| 4,660,651 A | 4/1987 | Pfenninger et al. | |
| 4,664,202 A * | 5/1987 | Applequist et al. | 172/311 |
| 5,113,956 A | 5/1992 | Friesen et al. | |
| 5,155,986 A | 10/1992 | Kelderman | |
| 5,377,482 A | 1/1995 | Knigge | |
| 5,488,996 A | 2/1996 | Barry et al. | |
| 5,493,853 A | 2/1996 | Tonutti | |
| 5,598,691 A | 2/1997 | Peeters | |
| 5,647,440 A | 7/1997 | Barry et al. | |
| 5,685,135 A | 11/1997 | Menichetti | |
| 5,752,375 A | 5/1998 | Tonutti | |
| 5,787,988 A | 8/1998 | Harlan et al. | |
| 5,829,370 A | 11/1998 | Bender | |
| 6,205,937 B1 | 3/2001 | Shoup | |
| 6,405,517 B1 | 6/2002 | Peeters et al. | |
| 6,543,212 B2 | 4/2003 | Tonutti | |
| 6,663,134 B2 | 12/2003 | Paluch et al. | |
| 6,945,024 B2 | 9/2005 | Tonutti | |
| 7,313,905 B2 | 1/2008 | Vaske et al. | |
| 7,360,353 B2 | 4/2008 | Hruska et al. | |
| 7,540,139 B2 | 6/2009 | Rowse et al. | |
| 7,604,068 B1 | 10/2009 | Friesen | |
| 7,854,273 B2 | 12/2010 | Friggstad et al. | |
| 8,127,861 B2 | 3/2012 | Meek | |
| 8,291,994 B2 * | 10/2012 | Hulicsko | 172/311 |
| 8,567,518 B2 * | 10/2013 | Arnold et al. | 172/311 |
| 2004/0083705 A1 * | 5/2004 | Tonutti | 56/377 |
| 2005/0087350 A1 | 4/2005 | Bauer | |
| 2006/0090910 A1 * | 5/2006 | Houck | 172/272 |
| 2007/0163791 A1 | 7/2007 | Meek | |

FOREIGN PATENT DOCUMENTS

| | | |
|---|---|---|
| EP | 1077595 B1 | 9/2003 |
| EP | 1488685 B1 | 10/2006 |
| SU | 1259975 A1 | 9/1986 |
| WO | 8801470 A1 | 3/1988 |
| WO | 9746076 A1 | 12/1997 |
| WO | 2005099428 A1 | 10/2005 |

OTHER PUBLICATIONS

The International Preliminary Report on Patentability for PCT/NL2011/000017 issued on Sep. 11, 2012.

* cited by examiner

HAYMAKING DEVICE MOVABLE BETWEEN TRANSPORT AND OPERATIVE POSITIONS AND METHOD THEREFOR

CROSS REFERENCE TO RELATED APPLICATIONS

This application is a divisional of U.S. patent application ser. No. 13/606,038 filed on 7 Sep. 2012, which is a of PCT application number PCT/NL2011/000017 filed on 4 Mar. 2011, which claims priority from Netherlands application number NL 1037783 filed on 8 Mar. 2010. All applications are hereby incorporated by reference in their entireties.

BACKGROUND OF THE INVENTION

1. Field of the Invention

The invention relates to a device for working a crop, such as a rake, a tedder or a mower. In particular, the invention relates to a device for displacing mown crop, more in particular mown grass. In particular, the invention relates to a rake device. Rake devices can be designed so as to have a central frame and side arms projecting on both sides thereof, on which side arms one or more rake wheels are mounted. The side arms are connected to the frame by means of hinges in order to be able to rotate between a rest position, in which they extend substantially parallel to each other, and one or more operative positions, in which they extend sidewardly. In order to limit the width in the transport position, the rake wheels can be pivoted to a position in which their axes of rotation are oriented substantially horizontally and in which they are completely free from the ground.

2. Description of the Related Art

EP 1.488.685, which is incorporated by reference in its entirety, shows a multiple rake device having a longitudinal girder to be coupled to a tractor and supported by a wheel set, which longitudinal girder is telescopically adjustable in length. The side arms are hingeably mounted to the rear end of the longitudinal girder, where also a transmission, in the form of a gearbox, of the drive for the rake wheels is located. Between the longitudinal girder and the side arms there are mounted holding rods, one end of which is hingeably mounted to the side arms and the opposite end of which is hingeably mounted to a slide element which is slidable along the longitudinal girder. In the transport position, the slide element is located on the front end of the longitudinal girder and the holding rods extend rearwardly parallel to the longitudinal girder. The side arms then extend forwardly parallel to the longitudinal girder.

U.S. Pat. No. 5,647,440, which is incorporated herein by reference in its entirety, shows a device with a comparable basic construction, provided with tools for planting, spraying or ploughing, comprising a main beam which is telescopically adjustable in length and two side arms which are hingeably connected to the main beam at the rear end thereof and which carry the tools. The side arms are further movably connected to the front part of the main beam by means of holding rods. In order to bring the side arms from a spread operative position, in which they define a forwardly opening V-shape, to a transport position parallel to the main beam, the length of the main beam is reduced so that the distance between the front part and the end part is reduced. In order to change the weight distribution for transport, the support wheel set, which is located at the rear end, is displaced forwardly.

EP 1.077.595, which is incorporated herein by reference in its entirety, shows a multiple rake device in which the rake wheels are mounted on respective side arms, which side arms are also pivotable upwardly to a transport position. The side arms are hingeably mounted to the rear end of a longitudinal girder, where also a transmission of the drive for the rake wheels is located. A slide element is movable on the longitudinal girder, which slide element is movably connected to the side arms by means of holding rods.

BRIEF SUMMARY OF THE INVENTION

It is an object of the invention to provide a haymaking device having a frame with a main beam, and two side arms, which device can be brought into and out of the transport position in a favourable manner.

It is an object of the invention to provide a haymaking device, by means of which the distribution of the mass can be influenced in a simple and/or favourable manner when switching between the operative position and the transport position.

It is an object of the invention to provide a haymaking device, which device has an improved driving behaviour in the transport position, drawn by a tractor, in particular with respect to rocking and/or swinging.

It is an object of the invention to provide a haymaking device, which has an improved stability during transport behind a tractor.

It is an object of the invention to provide a haymaking device, which is compact.

From one aspect, the invention provides a haymaking device comprising a frame having a main beam extending in a longitudinal direction, which main beam defines a longitudinal centre line, and two side arms extending sidewardly from the main beam on both sides thereof, wherein the side arms each carry one crop processing tool and are hingeably connected at an inner end to a slide connection which is slidable there along the main beam, wherein the side arms are movable between a transport position, in which they substantially extend along the main beam, at a first angle to the main beam, and an operative position, in which the side arms extend from the main beam, at a second angle, larger than the first angle, wherein the side arms are displaceable between the transport position and the operative position by sliding of the slide connection along the main beam. This results in a changed position of the inner ends of the side arms, and consequently in a changed position of a part of the mass of the device, when viewed in longitudinal direction.

In one embodiment, in which the device has a front end and a rear end, the slide connection is located closer to the front end in the transport position than in the operative position. In the case of the above-mentioned known rake devices, in the transport position a relatively large part of the mass is carried by the support wheels instead of by the coupling to the tractor, as a result of which the rake device drawn by the tractor shows an instable behaviour, in particular may yaw around the coupling to the tractor during road transport. In this embodiment of the device according to the invention, when passing from the operative position to the transport position, the mass can be brought further to the front end, where the coupling will be located, which enhances the stability during transport. In addition, this makes it possible to limit the length of the longitudinal girder.

In a further development of the device according to the invention, the side arms and the main beam are interconnected at a distance from the slide connection by means of a respective holding rod both ends of which are hingeably connected to the respective side arm and the main beam. In this case, the inner ends of the holding rods are preferably stationary attached to the main beam when viewed in longitudinal direction. If the main beam is provided at a front end with means for hitching to a tractor (e.g. a hitch), the inner ends of the holding rods and the hitching means can, in a simple embodiment, be mutually stationary when viewed in longitudinal direction.

Each side arm can be provided with a support wheel for supporting the side arm in the operative position and in the transport position. In this case, said support wheel moves together with the side arm when the side arm moves between the operative position and the transport position. In this case, the distance between the front end and the support wheel increases during the movement from the working position to the transport position when viewed in longitudinal direction. The possibilities of influencing the distribution of the mass are further increased if the hitching means and the two support wheels form the sole support points for the device in the transport position.

In one embodiment, the tools are rotating tools, wherein a main drive shaft extends along the main beam, wherein secondary drive shafts are mounted on both sides of the main beam for the drive of the tool carried by the respective side arm, wherein the main drive shaft and the secondary drive shafts are in operative connection with each other by means of a first transmission, in particular a gearbox, wherein the first transmission and the slide connection are interconnected for interconnected movement, in particular at least partially simultaneously, whether or not according to differently shaped paths of movement. The interconnection can take place by means of one or more connecting rods which can directly transmit pulling and pushing forces. Due to the connection to the first transmission, the secondary drive shafts are thus able to follow at least partially the movement of the side arm from the operative position to the transport position and vice versa.

In one embodiment, there are also provided means for keeping the slide element and the first transmission disconnected from each other over a part of the movement of the slide connection or the first transmission. It is thus possible to achieve a movement sequence, in dependence on when and over which trajectory the connected movement is desired.

In an embodiment thereof, the device is provided with a stop for limiting the movement of the first transmission and with means for disengaging the connection between the slide connection and the first transmission when the first transmission arrives at the stop. In that case, the slide connection can be displaced further, in particular to the transport position.

In a further development with interconnected movement of the first transmission and the slide connection, the first transmission is movable in a vertical plane which contains the longitudinal centre line. Interference of the first transmission with other construction parts is prevented to a significant extent by the movement in the vertical plane.

In this case, the first transmission can be movable in a movement with a horizontal directional component oriented along the main beam.

In a first development thereof, the first transmission is movable in a movement parallel to the main beam which is then preferably provided with a guide means (e.g., guide mechanism) for the movement of the first transmission. If the main drive shaft is adjustable in length, it will be possible for the main drive shaft to follow the movement of the slide connection by shortening/lengthening.

In a second, further development, the first transmission is also movable with a vertical directional component in said vertical plane, preferably in an area above the main beam, where sufficient space is available. In this case, the first transmission can be pivotable for movement about a pivot centre line transverse to the vertical plane. In a compact embodiment, the first transmission is then mounted on a pivot arm a first end of which is mounted to the main beam in a manner in which it is pivotable about the pivot centre line. In an embodiment thereof, the ends of the connecting rod are rotatably connected to the slide connection and the pivot arm, respectively, at a distance from the first end thereof. The entrance of the first transmission can be operatively connected to a rear end of the main drive shaft by means of an intermediate drive shaft, wherein a front end of the main beam is provided with means for hitching to a tractor, wherein the rear end of the main drive shaft is stationary in longitudinal direction with respect to the hitching means. The first transmission can be rotatable with respect to the pivot arm about a centre line which is parallel to the pivot centre line of the pivot arm.

In a further development of the device according to the invention, said secondary drive shafts are adjustable in length.

Said second ends of the secondary drive shafts can be functionally connected to respective further transmissions, in particular gearboxes, which are mounted on the respective side arm, preferably in each case near the end of the respective side arm, wherein the further transmissions are in operative connection with at least one crop processing tool. In each case more than one crop processing tool can be mounted on the end of the respective side arm, wherein the crop processing tools mounted on the respective side arm are driven by the same secondary drive shaft. In a compact embodiment, the further transmissions are located in each case between the two crop processing tools, when viewed in transverse direction.

In particular, the crop processing tool can be a rake provided with a circular rake wheel having a substantially vertical rotor centre line in operative position.

From a further aspect, the invention provides a method of changing the working width of a haymaking device comprising a frame which is provided at a front end with means for hitching the device to a tractor, wherein the frame defines a longitudinal centre line and comprises two side arms extending on both sides of the longitudinal centre line, wherein the side arms each carry at least one crop processing tool and are at an inner end hingeably connected to the rest of the frame, wherein the working width of the device is reduced by reducing the distance defined along the longitudinal centre line between the inner ends of the side arms and the hitching means whilst increasing the angle between the side arms and the forward directional component of the longitudinal centre line.

In order to bring the device into a transport position, said angle can be increased to at least substantially 180 degrees. For the transport position, the crop processing tools are brought into an out-of-operation position with respect to the side arms.

From a further aspect, the invention provides a method of changing the working width of a haymaking device comprising a frame which is provided at a front end with means for hitching the device to a tractor, wherein the frame defines a longitudinal centre line and comprises two side arms extending on both sides of the longitudinal centre line, wherein the side arms each carry at least one crop processing tool and are at an inner end hingeably connected to the rest of the frame, wherein the working width of the device is increased by increasing the distance defined along the longitudinal centre line between the inner ends of the side arms and the hitching means whilst reducing the angle between the side arms and the forward directional component of the longitudinal centre line.

In the above-mentioned methods according to the invention, the change of the distance between the inner ends of the side arms and the hitching means can take place by sliding of a slide connection across a longitudinal girder forming part of the frame, to which slide connection the inner ends of the side arms are hingeably connected.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings. FIGS. 1 and 2A-C show a circular rake device 1 with direction of travel W, comprising a main beam 2 which defines a longitudinal centre line S of the device 1 and a front end of which is provided with a hitch 3 for hitching to a non-shown tractor. The hitch 3 provides three degrees of rotation (X,Y,Z). On the main beam 2, which is also referred to herein as a longitudinal girder, there is provided a slide connection element 5 which is slidable over/along the main beam, parallel to the longitudinal centre line S, see arrows A.

Two side arms 4a,b extend on both sides of the main beam 2, from the slide element 5 at equal angles alpha ($\alpha$) with the longitudinal centre line S. The outer ends of the side arms 4a,b are provided with subframes or secondary frames, hereinafter to be called satellite frames 6a,b. As will be explained hereinafter, the satellite frames 6a,b are rotatable there about substantially vertical hinge centre lines with respect to the side arms in the direction D. The satellite frames 6a,b each carry two circular rakes 7a,8a and 7b,8b with substantially vertical rotational centre lines R1,3,2,4, respectively, and are supported by frame support wheels 9a,b which are located in the shadow of circular rakes 7a,b. The two satellite frames 6a,b make the device 1 resemble to some extent to a catamaran.

The side arms 4a,b are further connected to the main beam 2 (see also FIG. 2C) by means of holding rods 10a,b, the outer ends of said holding rods 10a,b being hingeably connected in the region of hinges 12a,b to brackets 11a,b which are mounted on the side arms 4a,b. The inner ends of the holding rods 10a,b are hingeably mounted to the slide element 5 in the region of hinges 14a,b. The holding rods 10a,b and the part (here approximately ⅓) of the side arms 4a,b between the hinges 12a,b and 14a,b form, together with a part of the main beam 2 that is adjustable in length by means of the slide element 5, triangles which are transformable in shape.

Aligning rods 16a,b extend along the front side of the side arms 4a,b, partially shielded by hoods 17a,b, towards the hub holders 19a,b for the wheels 9a,b. The hub holders 19a,b are hingeably connected to both the outer ends of the side arms 4a,b (by hinge pin 18a,b, see FIG. 2D) and to the outer ends of the aligning rods 16a,b (by hinge pin 82a,b, see FIG. 2D), in such a manner that a parallelogram mechanism active in a horizontal plane is formed, in which the hub holder and the slide element form the short sides. The aligning rod 16a,b is slidably connected indirectly, by means of the slide element 5, to the main beam 2, as well as the side arm 4a,b.

Also owing to the fact that the satellite frames 6a,b form a rotationally fixed unit with the hub holders 19a,b (rigidly mounted on upper plate 83a,b—FIG. 2D—of hub holders 19a,b), they will maintain their orientation with respect to the longitudinal centre line S in the case of deformation of the parallelogram mechanisms. The satellite frames 6a,b are located above the upper surface of the side arms 4a,b so that the relative rotation of the side arms 4a,b with respect to the satellite frames 6a,b in the direction B is not impeded.

Figure 5A:
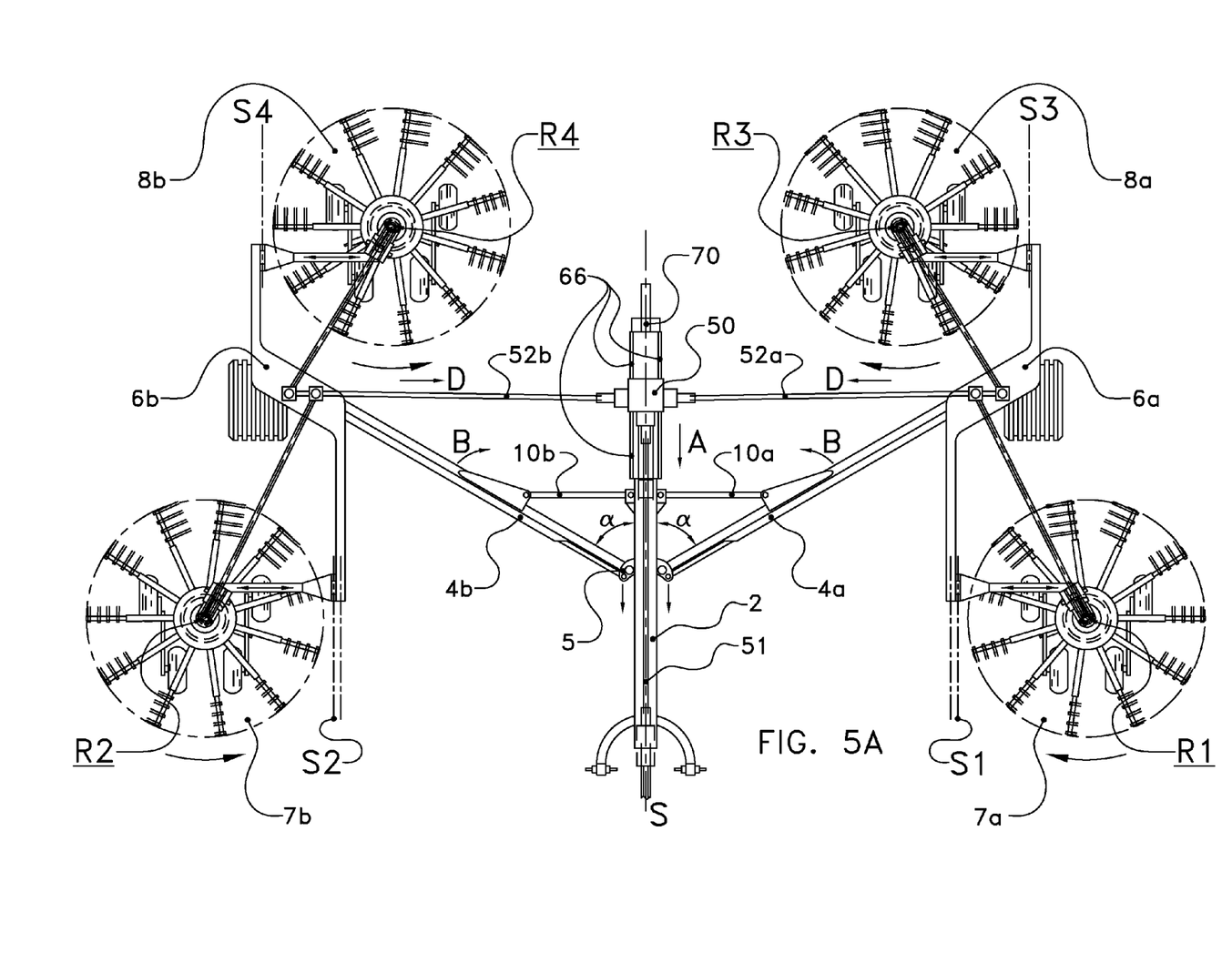
FIGS. 5A, 5B and 5C show, in a top view, the operative position of FIG. 1, a narrower operative position and a transport position of the device of FIG. 1.
Figure 5B:
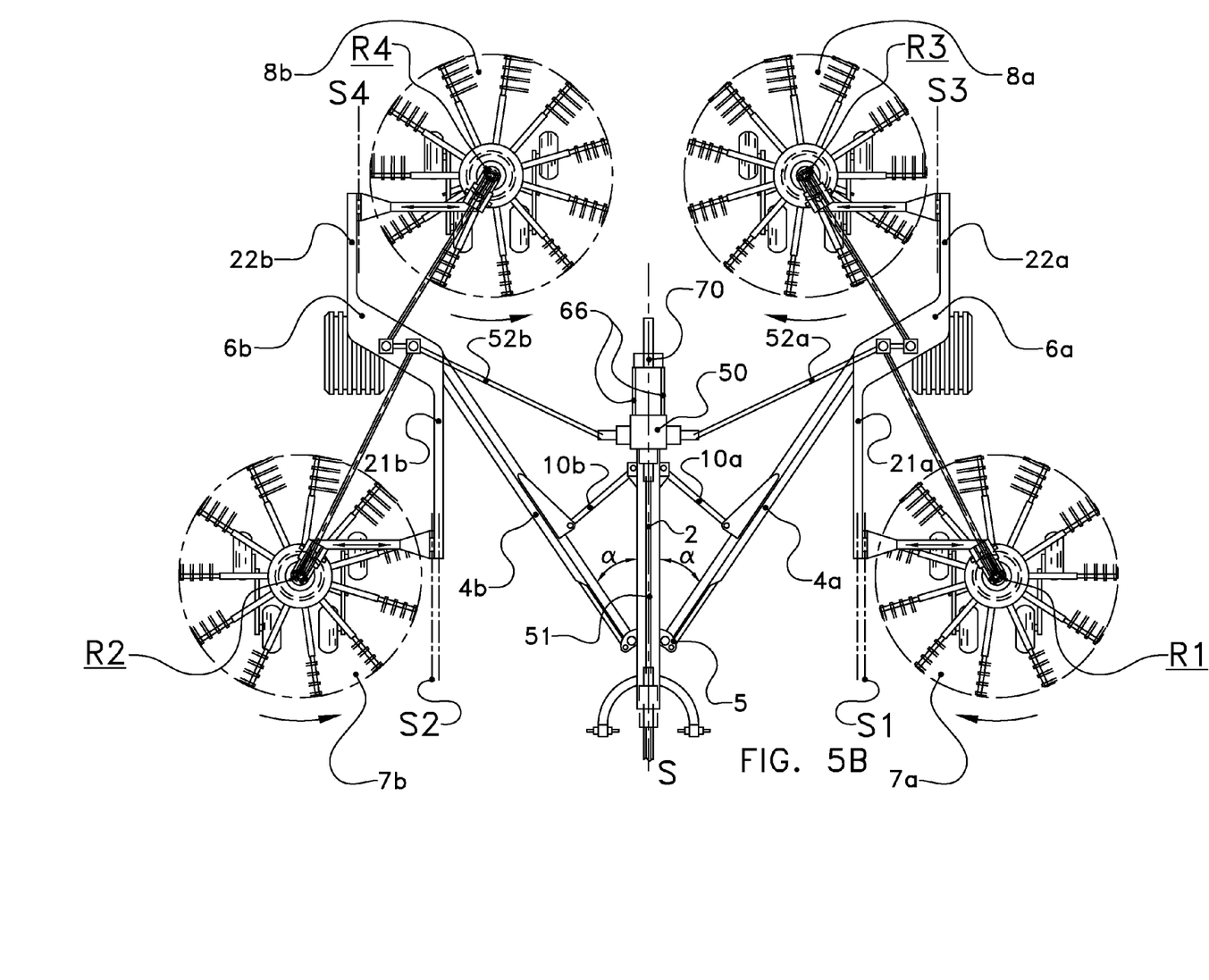

The satellite frames 6a,b, see also FIGS. 5A,B, each comprise a forwardly oriented satellite arm 21a,b and a rearwardly oriented satellite arm 22a,b, which carry the circular rakes 7a,b and 8a,b, respectively, when these are not supported by wheel sets 31a,b and 32a,b, known per se, which carry the circular rakes in the normal operative position. The satellite arms 21a,b and 22a,b extend parallel to the longitudinal centre line S.

Outwardly oriented pivot arms 23a,b are mounted to the front ends of the satellite arms 21a,b in a manner in which they are pivotable in a vertical plane about pivot centre lines C1,2 between an operative position and one or more raised positions, in particular an upwardly pivoted transport position. They each comprise a telescopic arm 33a,b with retractable/extendable arm parts 35a,b and cylinders 37a,b with piston rods 39a,b whose ends are mounted to the arm parts 35a,b. The arm parts 35a,b carry rotors 25a,b on which rake arms 27a,b with rake pins 29a,b are removably mounted in a manner known per se. In the operative position, the rotors 25a,b have substantially vertical rotor centre lines R1.2. For the pivoting movement of the pivot arms 23a,b, cylinders 41a,b are provided, whose piston rods 43a,b engage the telescopic arms 33a,b.

Outwardly oriented pivot arms 24a,b are mounted to the rear ends of the arms 22a,b in a manner in which they are pivotable in a vertical plane about pivot centre lines C3,4 between an operative position and one or more raised positions, in particular an upwardly pivoted transport position. They each comprise a telescopic arm 34a,b with retractable/extendable arm parts 36a,b and cylinders 38a,b with piston rods 40a,b whose ends are mounted to the arm parts 36a,b. The arm parts 36a,b carry rotors 26a,b on which rake arms 28a,b with rake pins 30a,b are removably mounted in a manner known per se. In the operative position, the rotors 26a,b have substantially vertical rotor centre lines R3,4. For the pivoting movement of the pivot arms 24a,b, cylinders 42a,b are provided, whose piston rods 44a,b engage the telescopic arms 34a,b.

The pivot arms 23a,b and 24a,b may be composed of identical components, so that a high degree of modularity is achieved.

The distance from the satellite arms 21a,b to the longitudinal centre line S is smaller than the distance from the satellite arms 22a,b to the longitudinal centre line S, and the same applies to the location of the pivot centre lines C1,2 with respect to the pivot centre lines C3,4, see also FIG. 5A. The rotor centre lines R1,2 are located at a distance from the longitudinal centre line S, which distance is larger than that for the pivot centre lines C1,2 in the region of the pivot connection to the satellite arms 21a,b. On the contrary, the rotor centre lines R3,4 are located at a distance from the longitudinal centre line S, which distance is smaller than that for the pivot centre lines C3,4 in the region of the pivot connection to the satellite arms 22a,b. As a result thereof, the pivot arms 23a,b pivot upwardly and inwardly, and the pivot arms 24a,b pivot upwardly and outwardly.

For the drive of the rotors 25a,b and 26a,b, there is provided a central gearbox 50 which is movably supported by the main beam 2, in a vertical plane which contains the longitudinal centre line S. The central gearbox 50 forms a double right-angled transmission having exits 58a,b which are in line with each other and have an opposite transverse orientation. The entrance 58c of the central gearbox 50 is operatively coupled, by means of a cardan coupling, to a main drive shaft 51 which is telescopic and whose front end can be operatively coupled, by means of a cardan coupling and an intermediate shaft 51a in a bearing mounted on the front end of the main beam 2, to a power take-off shaft of a tractor. The exits 58a,b are operatively coupled, by means of cardan couplings, to telescopic secondary drive shafts 52a,b whose outer ends are operatively coupled, by means of cardan couplings, to second corner gearboxes 53a,b. The secondary drive shafts 52a,b are continued, by short drive shafts 54a,b, to third corner gearboxes 55a,b. The second and third gearboxes 53a,b and 55a,b each comprise exits which extend obliquely forwardly and outwardly, and obliquely rearwardly and inwardly, respectively. Telescopic rotor drive shafts 56a,b and 57a,b are operatively coupled, by means of cardan couplings, to said exits, for the drive of the rotors 25a,b and 26a,b of the circular rakes 7a,b and 8a,b.

Figure 1:
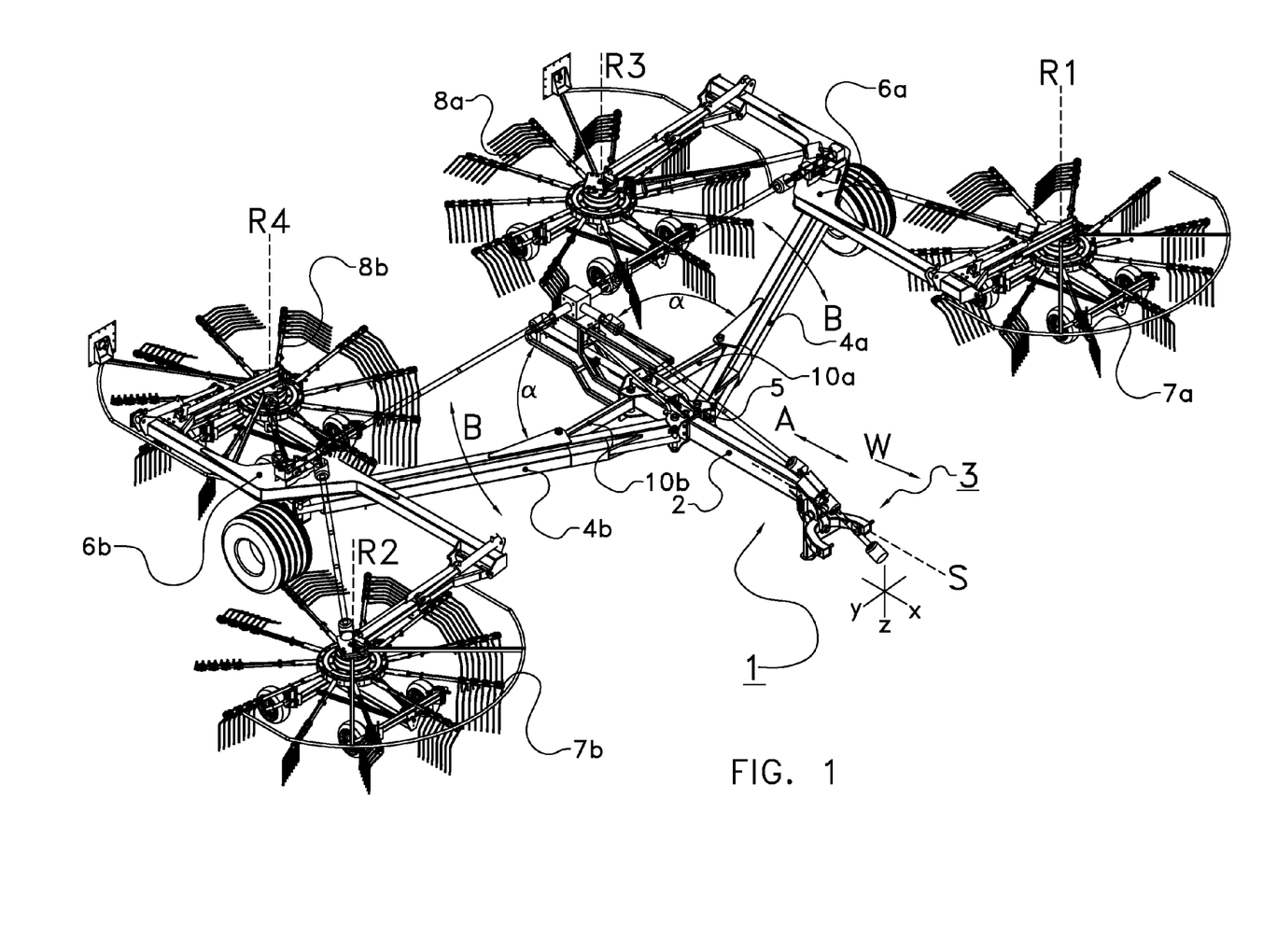
FIG. 1 shows an oblique front view of an exemplary embodiment of a haymaking device according to the invention, designed as a rake device.
Figure 2A:
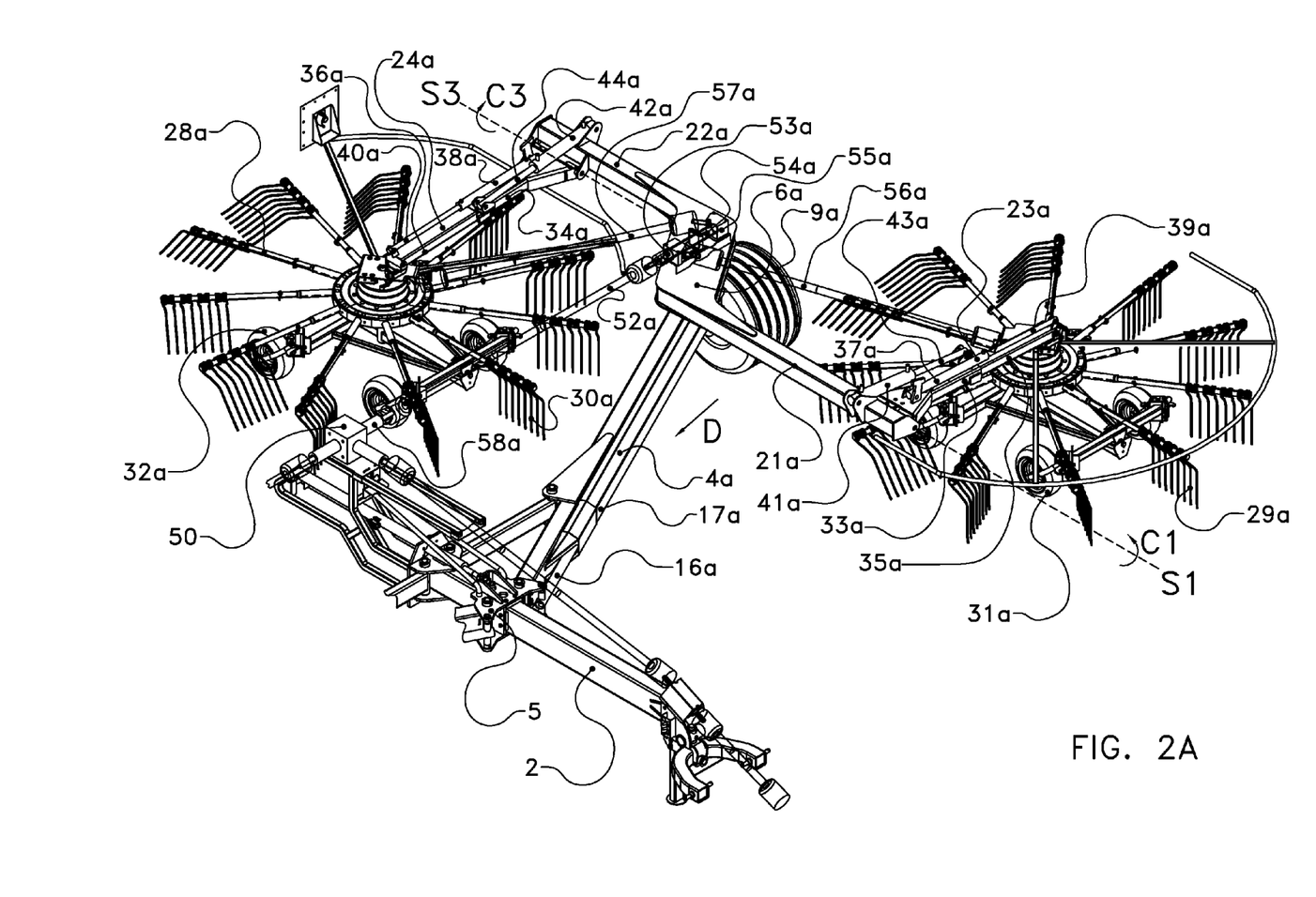
FIGS. 2A-D show an enlarged view of a left half, an enlarged view of a right half, an enlarged view of a central part and a detail of a part of the device of FIG. 1, respectively.
Figure 2B:
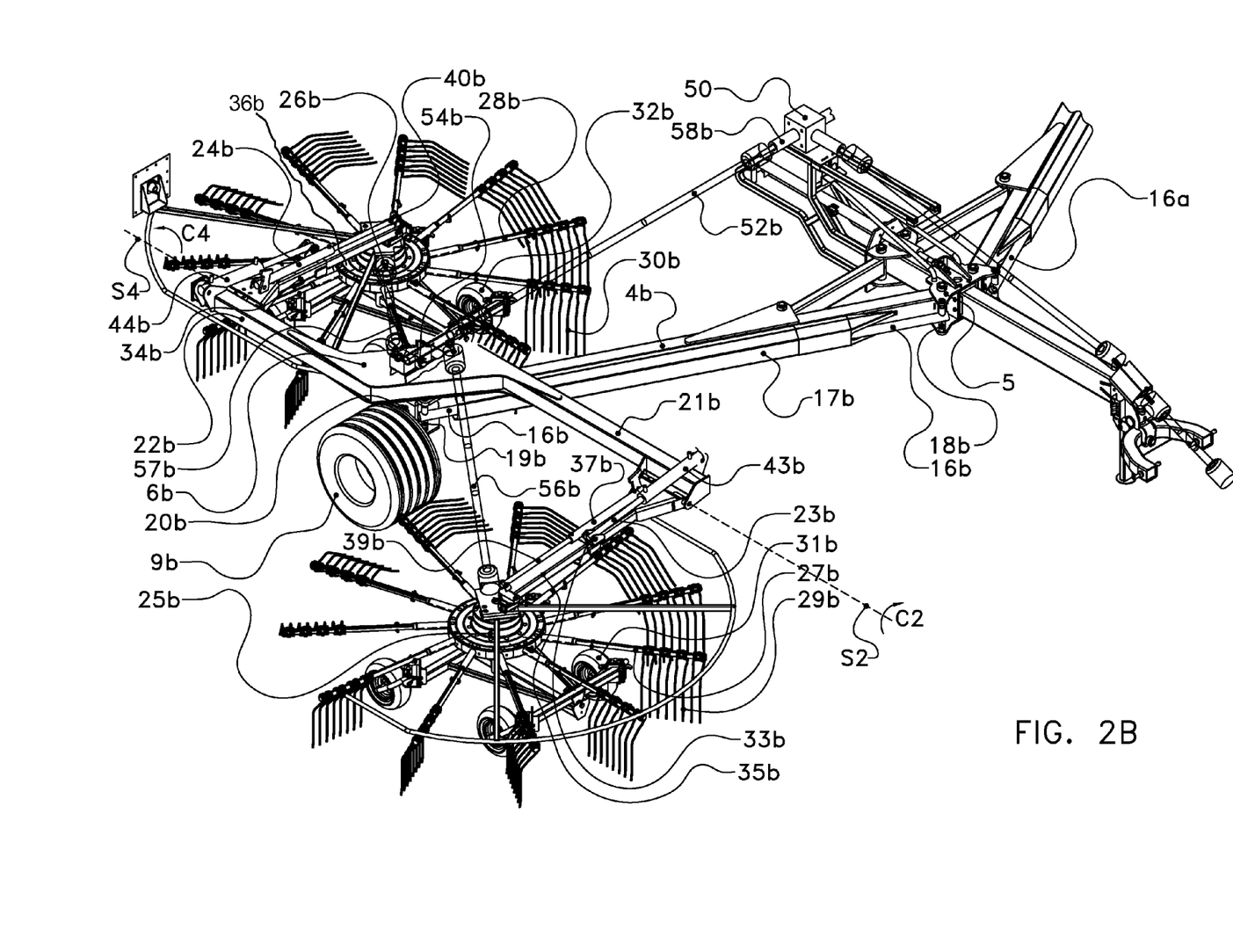
Figure 2C:
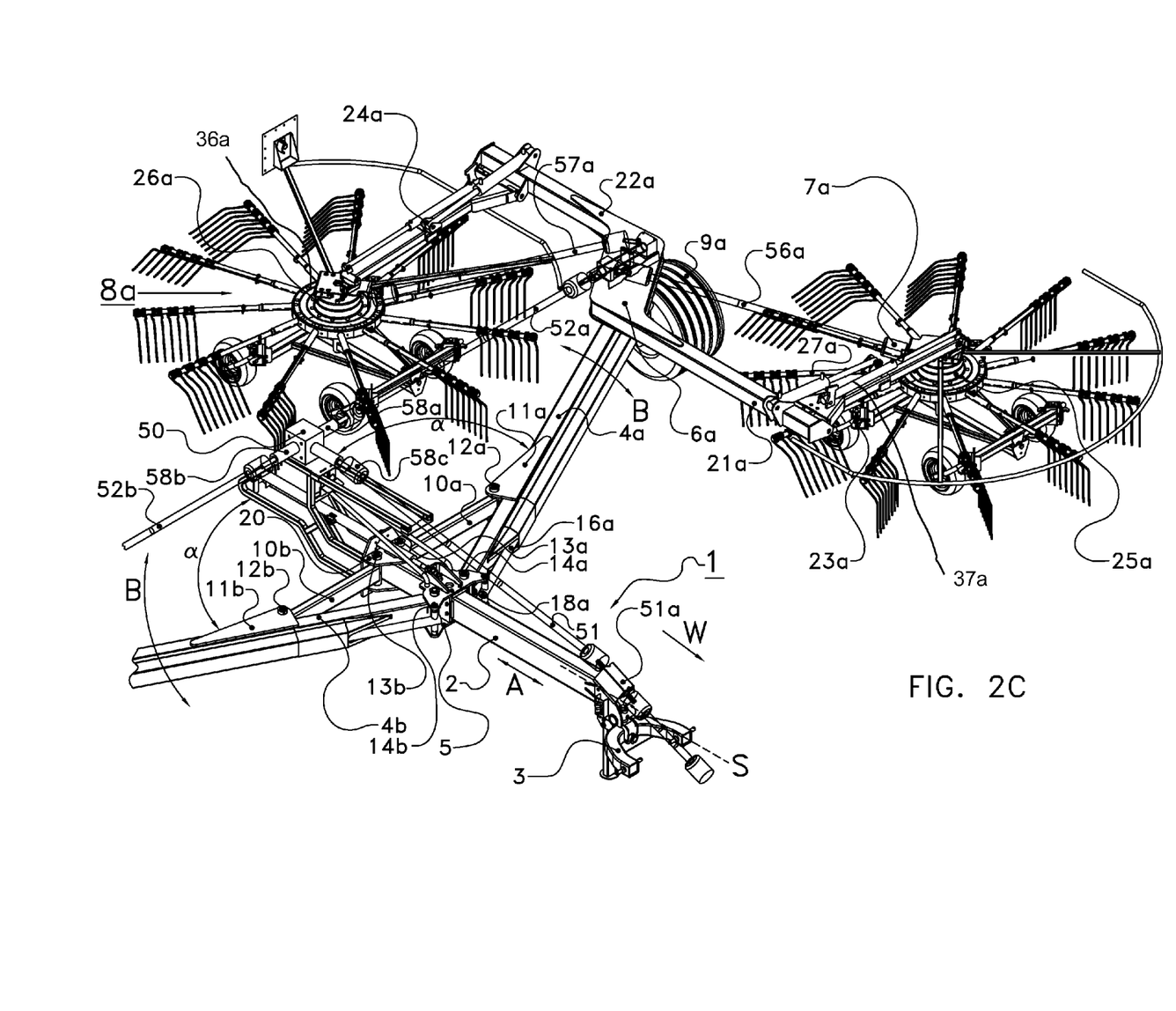
Figure 2D:
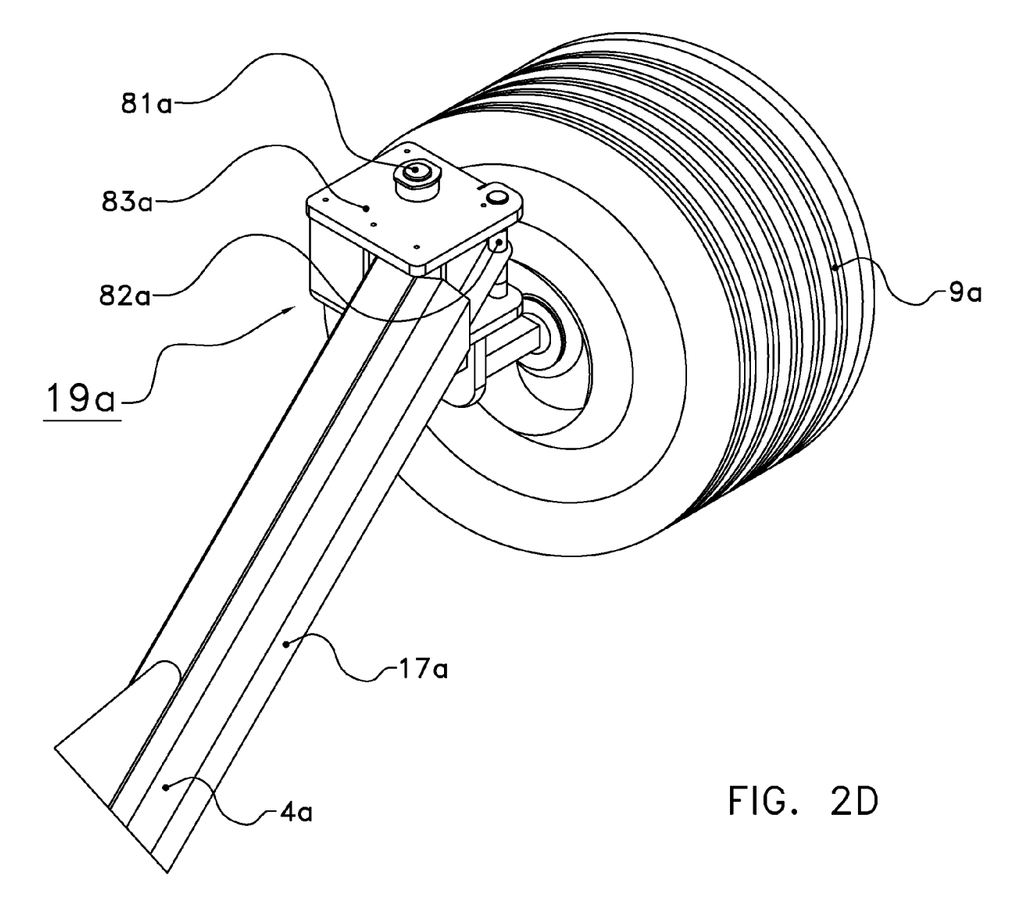
Figure 3A:
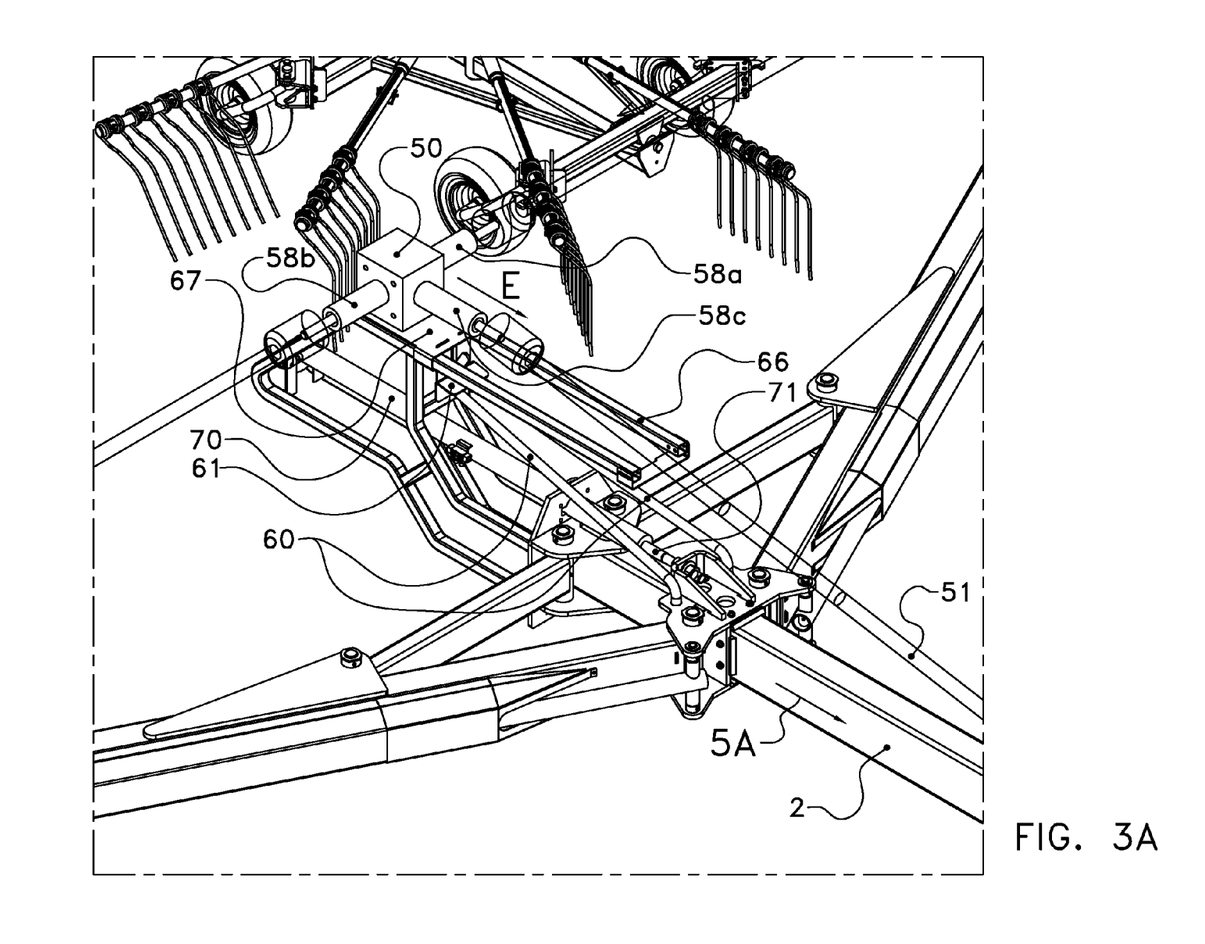
FIGS. 3A and 3B show details of the device of FIG. 1 in two stages of transition from an operative position to a transport position.
Figure 3B:
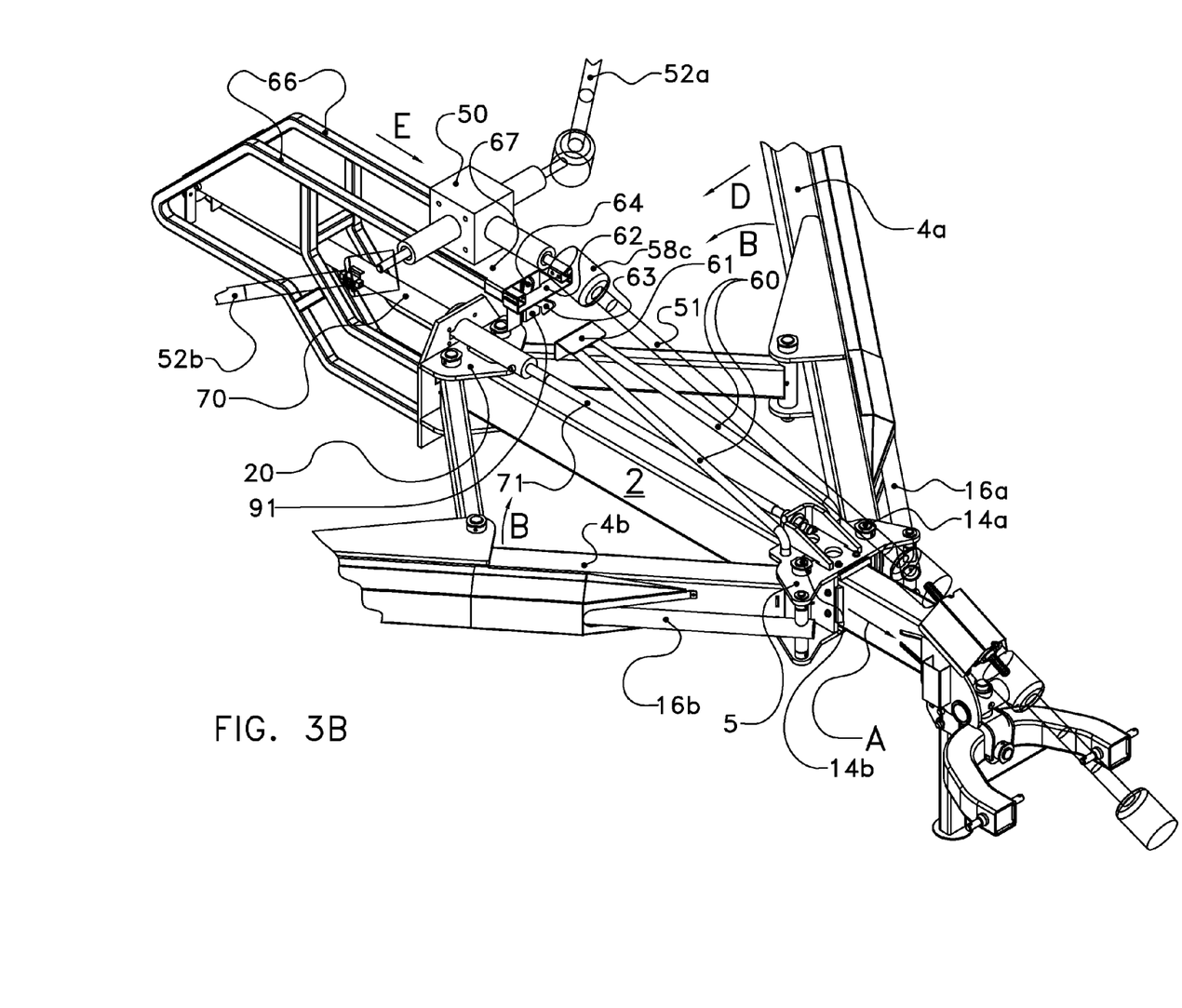

In the embodiment of FIGS. 1, 2A-, 3A and 3B, the central gearbox 50 is mounted on a slide 67 which is slidable in longitudinal direction (direction E) on rails 66 mounted on the main beam, the front ends of said rails being interconnected by a transverse rod 62 which forms a stop for the slide 67. The front side of the slide 67 is detachably connected, by means of a hook 63 (FIG. 3B), to a transverse section 61 mounted to the rear ends of two rigid pulling/pushing rods 60 whose front ends are mounted to the slide element 5 and have a substantially constant orientation. The hook 63 forms an integral whole with a catch 64 and is tiltable therewith in a vertical plane which contains the longitudinal centre line S. Below the hook 63, the slide 67 is provided with a forwardly oriented stop surface 91.

In order to move the slide element 5 along/over the main beam 2, a cylinder 70 is mounted, above the main beam 2, to said main beam, the piston rod 71 of said cylinder being mounted to the slide element 5.

The working width of the device 1 can be set by having the side arms 4a,b project sidewardly to a greater or lesser extent, by changing the angle alpha (α) between the side arms 4a,b and the main beam 2. The support wheels 9a,b follow that setting and maintain substantially their position with respect to the associated circular rakes. The working width can be set further (more precisely) by the cylinders 37a,b and 38a,b, by means of which the relative mutual position of the rake wheels 7a,8a and 7b,8b and their rotor centre lines in transverse direction can also be set.

When changing the working width of the device 1 and passing to the transport position, the aforementioned cardan couplings can assume the desired angular position.

In the position shown in FIGS. 1 and 5A, the angle alpha (α) is maximal and the holding rods 10a,b are transverse to the main beam 2 and the side arms 4a,b are at a rearwardly opening angle alpha (α) of approximately 65 degrees to the longitudinal centre line S.

Figure 5C:
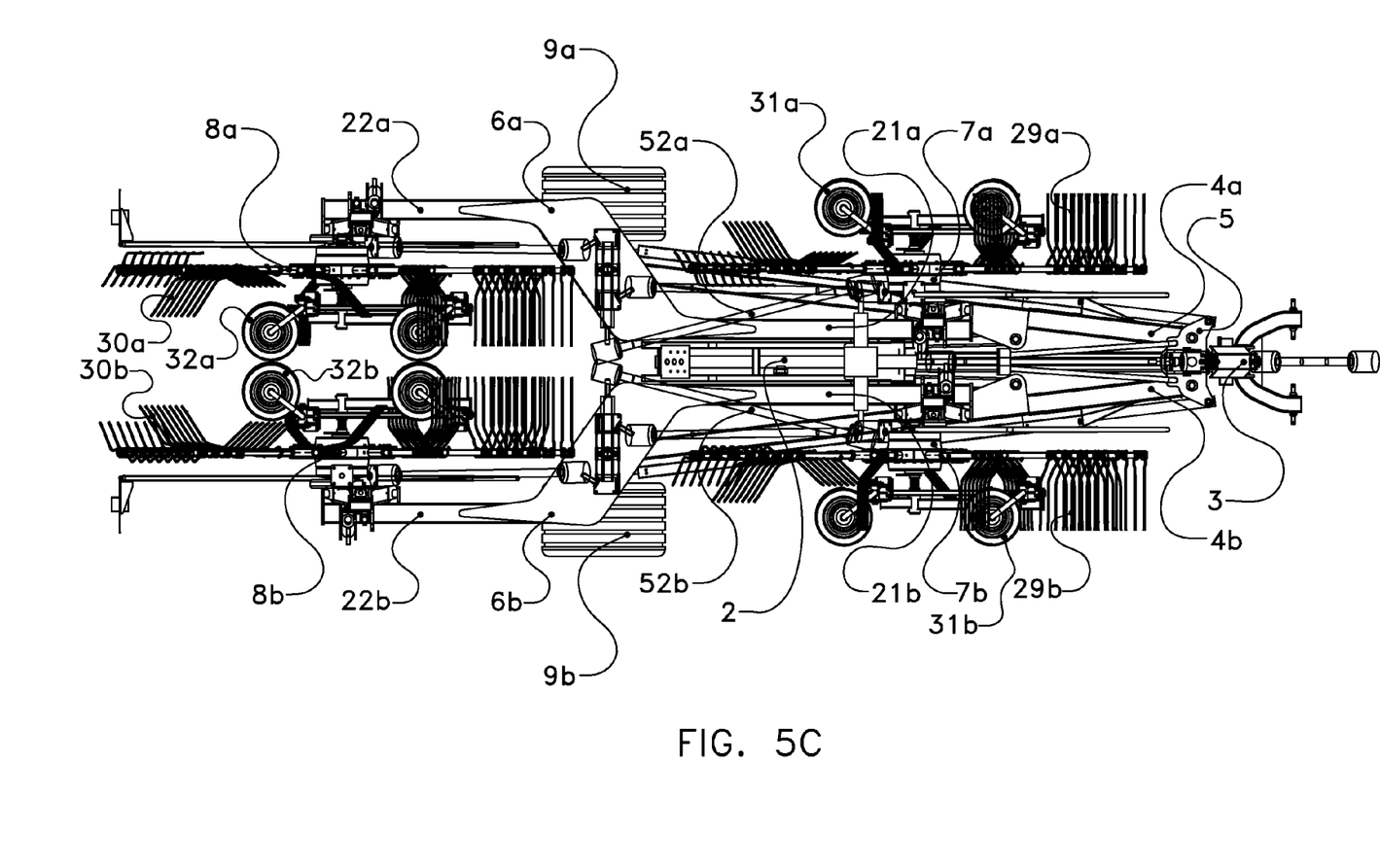

If it is desired to reduce the working width (from FIG. 5A to FIG. 5B) or to bring the device into the transport position (FIG. 5C), the cylinder 70 is activated, which results in that the slide element 5 is moved with respect to the bracket 20a,b, along/over the main beam 2, in forward direction (direction A). In the meantime, the device 1 is moved forwardly. The base of the aforementioned triangles is then increased and the angles made by the holding rods 10a,b and the side arms 4a,b with respect to said base are then decreased. When the desired working width has been achieved (see for example FIG. 5B), the operation of the cylinder 70, and consequently the movement of the slide element 5, is stopped. Due to the parallelogram mechanism of the aligning rods 16a,b, the hub holders 19a,b, the side arms 4a,b and the slide element 5, the support wheels 9a,b maintain their orientation in the direction of travel and the satellite frames 6a,b also maintain their orientation.

In the position of a minimum working width of FIG. 5B, the slide 67 has reached a position just behind the end of the rails 66 and the slide 67 and the slide element 5 are still interconnected.

Figure 4:
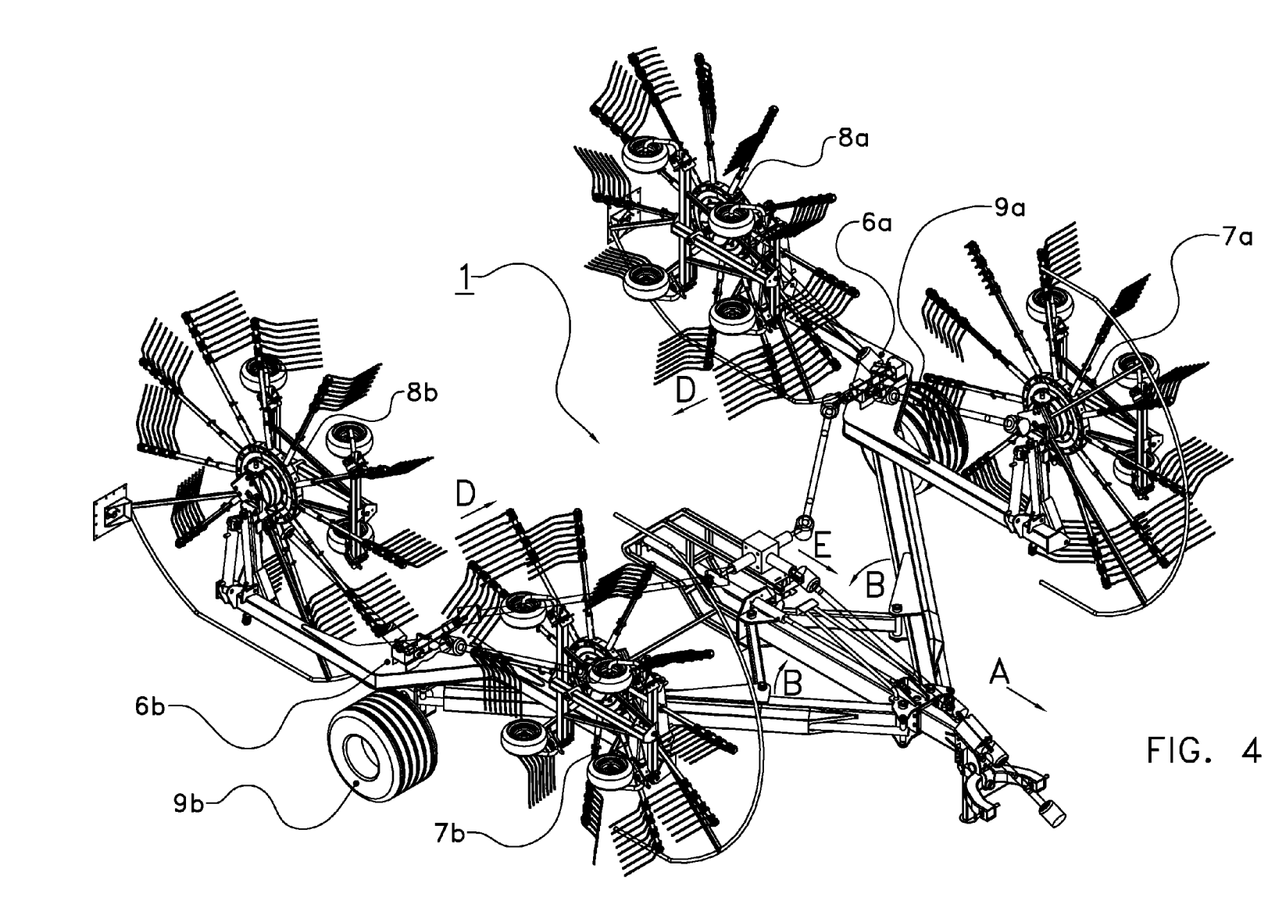
FIG. 4 shows the device of FIG. 1 during the transition from an operative position to the transport position.
Figure 6:
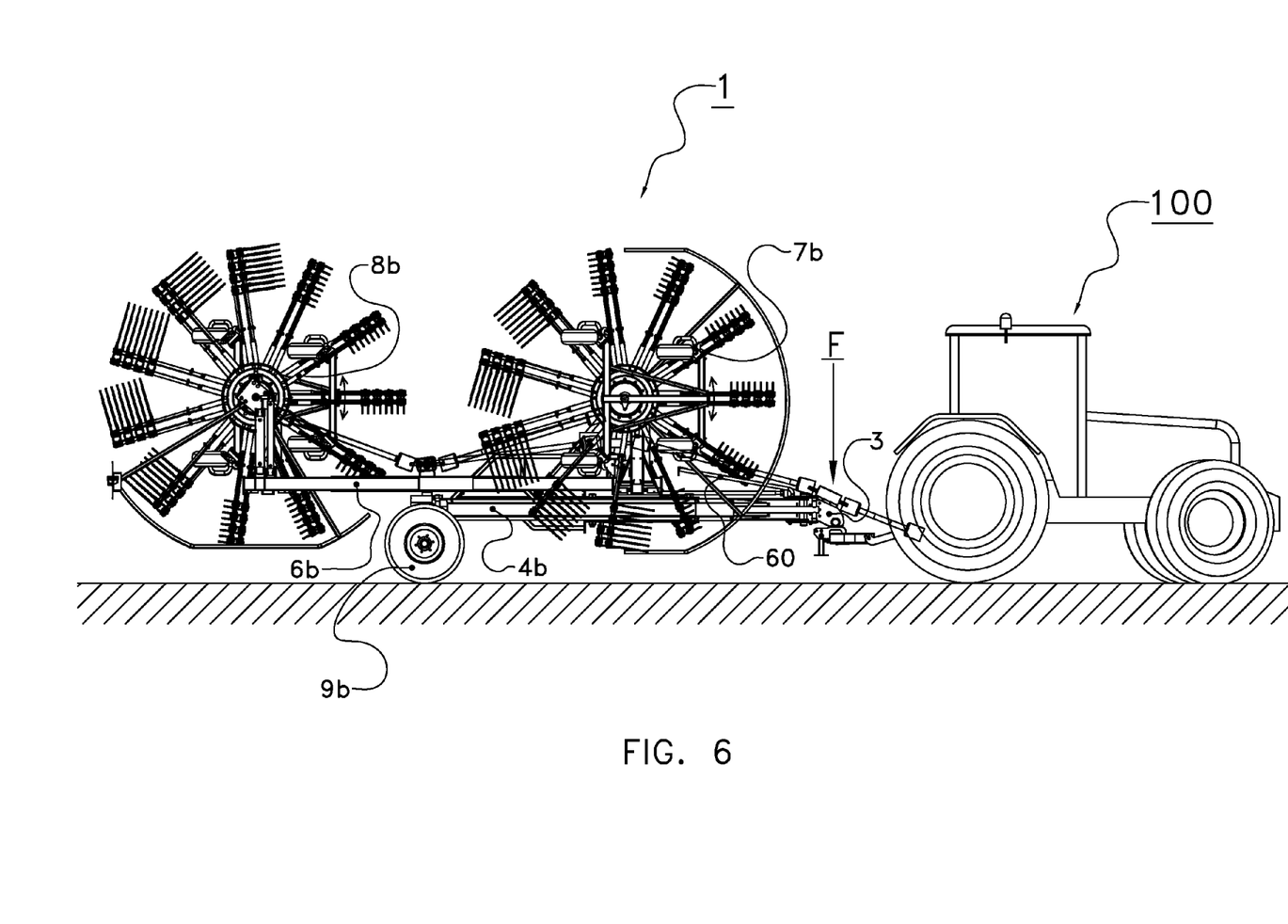
FIG. 6 shows a side view of the device of FIG. 1 in a transport position behind a tractor.

To pass to the transport position, the pivot arms 23a,b and 24a,b are operated in the then assumed operative position, in order to pivot the circular rakes 7a,b and 8a,b upwardly. The piston rod 71 is then extended and, via the position of FIG. 4, the slide element 5 is forced to the front end of the main beam 2, just behind the hitch 3. The holding rods 10a,b then—in the transport position of FIG. 5C—extend forwardly along the main beam 2. The side arms 4a,b now make a small angle of approximately 7 degrees with the longitudinal centre line S. The inner ends of the side arms 4a,b are then brought as close as possible to the hitch 3, as far as possible in front of the support wheels 9a,b, so that a larger part of the weight thereof and of the tools carried by the side arms can be absorbed by the hitch 3 of the tractor 100 (FIG. 6, arrow F), which enhances the stability during transport and limits a yawing movement. In addition, this makes it possible to limit the length of the main beam.

In this case, the sole support points of the device 1 are the frame support wheels 9a,b and the hitch 3 to the tractor 100.

When the side arms 4a,b are pivoted about the hinges 14a,b, the distance between the second and third gearboxes 53a,b, 55c,d and the longitudinal centre line S changes. This change should be absorbed by the telescopic secondary drive shafts 52a,b. However, telescopic shafts can do this only to a limited extent. By moving the ends of the secondary drive shafts also with respect to each other in a direction parallel to the longitudinal centre line S, the extent to which the shortening/lengthening is required can be limited.

In the embodiment of FIGS. 1,2A-C, 3A and 3B, for this purpose the slide 67, and consequently the central gearbox 50, is connected for collective movement to the slide element 5 via the rods 60. The main drive shaft 51 is then shortened in a telescopic manner. In this example, it has been decided not to take along the slide 67 over the entire trajectory of the slide element 5 and to limit the length of the rails 66, also with a view to the space available in the transport position (see FIGS. 5C and 6). For this purpose, at the arrival of the slide 67 at the end of the rails 66, the catch 64 abuts against the transverse rod 62, as a result of which the hook 63 is lifted. This means that the transverse section 61 is free from the hook 63 and the connection between the slide element 5 and the slide 67 is disengaged. The slide 67 remains at that position, while the slide element 5 can move further forwardly.

When the side arms 4a,b are again extended to an operative position, the piston rod 71 of the cylinder 70 is retracted and the slide element 5 again moves rearwardly. When the transverse section 61 abuts against the hook 63, the hook 63 is lifted to some extent and can engage again behind the transverse section 61. The transverse section 61 abuts against the stop surface 91 of the slide 67. The slide 67 is subsequently pushed rearwardly over the rails 66. In the meantime, the device 1 is moved rearwardly.

Figure 7:
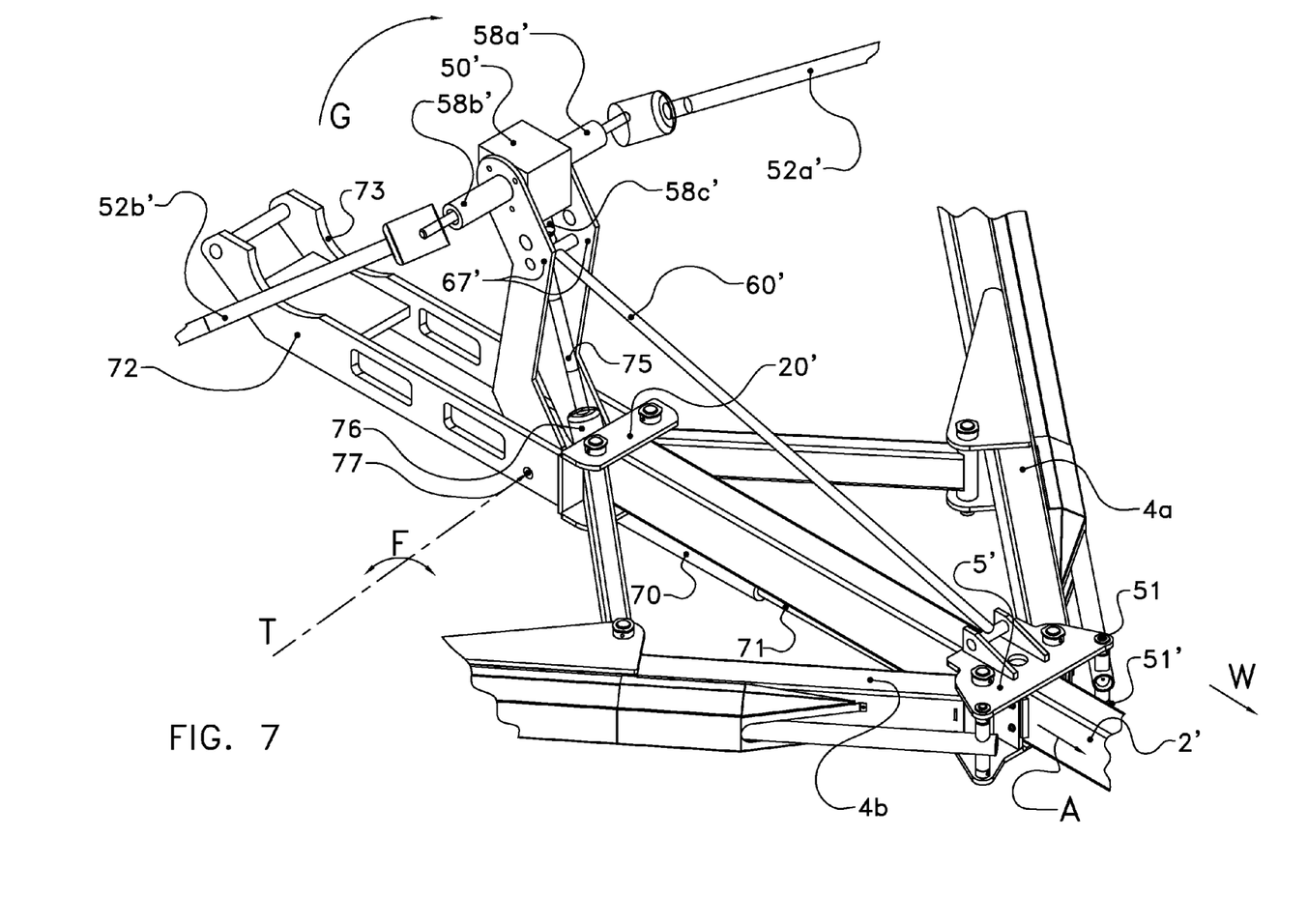
FIG. 7 shows an alternative embodiment of a central part of the device of FIG. 1.

FIG. 7 shows an alternative for making the central gearbox move along with the slide element. The central gearbox 50' is mounted to the end of a pivot arm 67'. In the region of a hinge 77 located somewhat behind the bracket 20', the pivot arm 67' is pivotable (F) about centre line T which is at right angles to a vertical centre plane which contains the centre line S. The central gearbox 50' cab rotate with respect to the arm 67' in said vertical centre plane (direction G). Within the pivot arm 67' there is an intermediate drive shaft 75 which is operatively coupled by means of a wide-angle cardan coupling 76 to the main drive shaft included in the main beam 2'. In a region between its ends, the pivot arm 67' is movably connected to the rear end of a pulling/pushing rod 60' whose front end is mounted to the slide element 5'. Here, the cylinder 7—is located below the main beam 2.

In the maximum operative position, the pivot arm 67' can be located in the main beam 2', the central gearbox 50' then being located at lateral openings 73 in the main beam 2', 72 through which the two exits of the central gearbox can project. The pivot arm 67' then rests in a position in which the connection to the connecting rod 6' is located at a higher level than the hinge 77. When the cylinder 70 is then activated and the slide element 5' is forced forwardly, the connecting rod 60' will make the pivot arm 67' pivot upwardly to the position shown in FIG. 6 and further, if desired, until the slide element 5' has arrived at the hitch 3 and the pivot arm 67' is in a forwardly tilted position. When the side arms 4a,b are again folded out, said movements take place in reverse order.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of changing the working width of a haymaking device comprising a frame which is provided at a front end with means for hitching the device to a tractor, the frame defining a longitudinal centre line and comprising two side arms extending on both sides of the longitudinal centre line, the side arms each carrying at least one crop processing tool and being at an inner end hingeably and slidably connected to the rest of the frame via hinge and slide connections, respectively, wherein sliding of the slide connection along a forward directional component of the longitudinal centre line reduces the working width of the device to a reduced working width by reducing the distance defined along the longitudinal centre line between the inner ends of the side arms and the hitching means while increasing the angle between the side arms and the forward directional component of the longitudinal centre line, and wherein the reduced working width defines an operative position of the device in which the side arms extend sidewardly.

2. The method according to claim 1, wherein the device is brought into a transport position by increasing said angle to at least substantially 180 degrees.

3. The method according to claim 1, wherein the slide connection is configured to slide along a longitudinal girder forming part of the frame, to which slide connection the inner ends of the side arms are hingeably connected.

4. A method of changing the working width of a haymaking device comprising a frame which is provided at a front end with means for hitching the device to a tractor, wherein the frame defines a longitudinal centre line and comprises two side arms extending on both sides of the longitudinal centre line, wherein the side arms each carry at least one crop processing tool and are at an inner end hingeably and slidably connected to the rest of the frame, wherein displacing the slide connection along a rearward direction component of the longitudinal centre line increases the working width of the device is increased to an increased working width by increasing the distance defined along the longitudinal centre line between the inner ends of the side arms and the hitching means whilst reducing the angle between the side arms and the forward directional component of the longitudinal centre line wherein the increased working width defines an operative position of the device in which the sidearms extend sidewardly.

5. The method according to claim 4, wherein the longitudinal centre line is defined along a longitudinal girder forming part of the frame.

6. A method of changing the working width of a haymaking device comprising:

providing haymaking device having a frame at a front end with means for hitching the device to a tractor, wherein the frame defines a longitudinal centre line and comprises two side arms extending on both sides of the longitudinal centre line, wherein the side arms each carry at least one crop processing tool and are at an inner end hingeably and slidably connected to the rest of the frame via hinge and slide connections, respectively, the side arms being extendable between a rest or transport position and one or more operative positions;

sliding the slide connection along a forward direction component of the longitudinal centre line to reduce the working width of the device to a reduced working width, wherein the reduced working width defines an operative position of the device in which the arms extend sidewardly; and sliding the slide connection along a rearward direction component of the longitudinal centre line to increase the working width of the device to an increased working width, wherein the increased working width defines a further operative position of the device in which the arms extend sidewardly.

* * * * *